(12) United States Patent
Misala

(10) Patent No.: US 10,995,777 B2
(45) Date of Patent: May 4, 2021

(54) ECCENTRIC MEMBER SUPPORT THAT INCLUDES A PISTON WITH AN EXPANDING RING TO INCREASE FRICTION AGAINST A CYLINDER WALL

(71) Applicant: Dr. Ing. h.c. F. Porsche Aktiengesellschaft, Stuttgart (DE)

(72) Inventor: Andreas Misala, Bietigheim-Bissingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 70 days.

(21) Appl. No.: 16/442,602

(22) Filed: Jun. 17, 2019

(65) Prior Publication Data

US 2019/0383311 A1 Dec. 19, 2019

(30) Foreign Application Priority Data

Jun. 15, 2018 (DE) ...................... 10 2018 114 349.4

(51) Int. Cl.
| | | |
|---|---|---|
| F02B 75/04 | (2006.01) | |
| F15B 15/14 | (2006.01) | |
| F16C 7/06 | (2006.01) | |
| F16J 1/12 | (2006.01) | |
| F16J 9/12 | (2006.01) | |

(52) U.S. Cl.
CPC ........ F15B 15/1452 (2013.01); F02B 75/045 (2013.01); F16C 7/06 (2013.01); F16J 1/12 (2013.01); F16J 9/12 (2013.01)

(58) Field of Classification Search
CPC ............... F02B 75/045; F15B 15/1452; F16C 2360/22; F16C 7/06; F16J 1/12; F16J 9/12
USPC ......... 123/193.2, 193.4, 193.6; 277/434, 436
See application file for complete search history.

(56) References Cited

U.S. PATENT DOCUMENTS

| 5,490,445 A * | 2/1996 | Rao ............................ F16J 1/08 |
| | | 123/193.6 |
| 2002/0119055 A1* | 8/2002 | Heller ................... F16D 25/083 |
| | | 417/316 |
| 2010/0303645 A1* | 12/2010 | Ohata ................. F04B 39/0016 |
| | | 417/254 |

FOREIGN PATENT DOCUMENTS

| DE | 10 2005 055 199 | 5/2007 |
| DE | 10 2015 109 024 | 9/2016 |
| DE | 10 2015 213 278 | 1/2017 |

OTHER PUBLICATIONS

German Search Report dated Mar. 26, 2019.

* cited by examiner

*Primary Examiner* — Phutthiwat Wongwian
*Assistant Examiner* — Diem T Tran
(74) *Attorney, Agent, or Firm* — Gerald E. Hespos; Michael J. Porco; Matthew T. Hespos

(57) ABSTRACT

A support for an eccentric of an adjusting arrangement of a connecting rod has a piston rod (18) guided by a piston (20). A seal (24) is connected to the piston (20) in a supporting cylinder (12, 14) in the connecting rod (2) and has a longitudinal axis (16). The piston (20) encloses a chamber (22) with the supporting cylinder (12, 14). The piston (20) has a lower part (30) arranged on an upper part (28) for movement along the axis (17) of the supporting cylinder (12, 14). An expanding ring (40) between the upper and lower parts (28, 30) interacts with faces (42, 44) of the lower part (30). The upper part (28) spreads the expanding ring (40) as the spacing between the faces (42, 44) is reduced, and the expanding ring (40) applies a friction force $F_R$ on an inner wall (46) of the supporting cylinder.

5 Claims, 3 Drawing Sheets

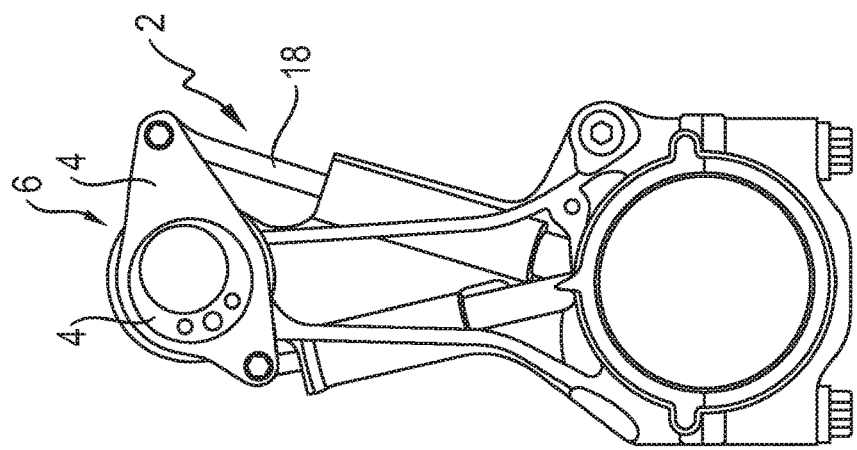
Fig. 2
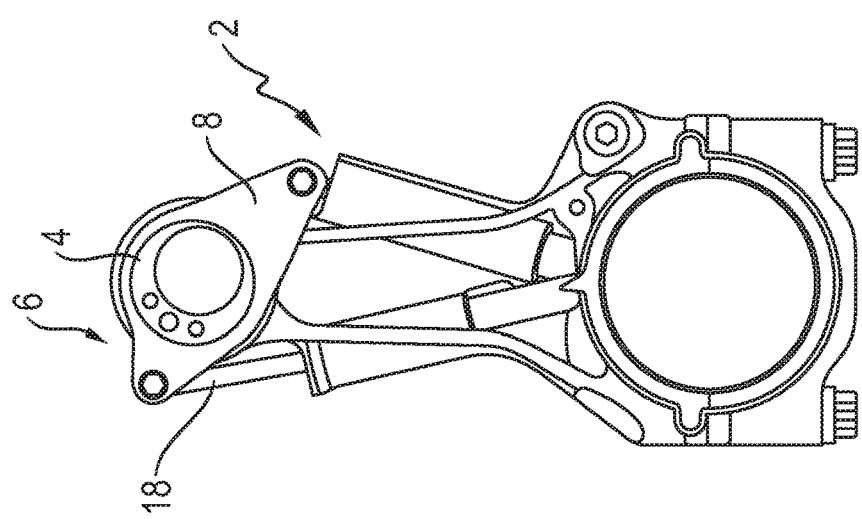
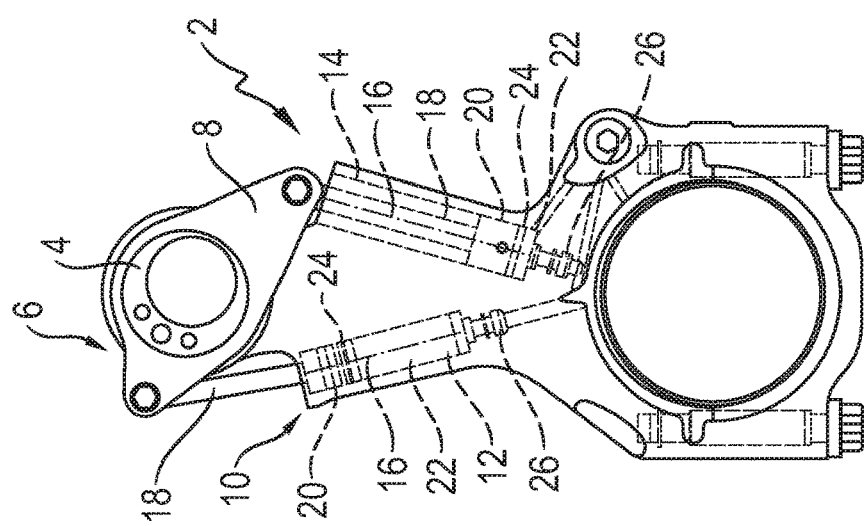
Fig. 1

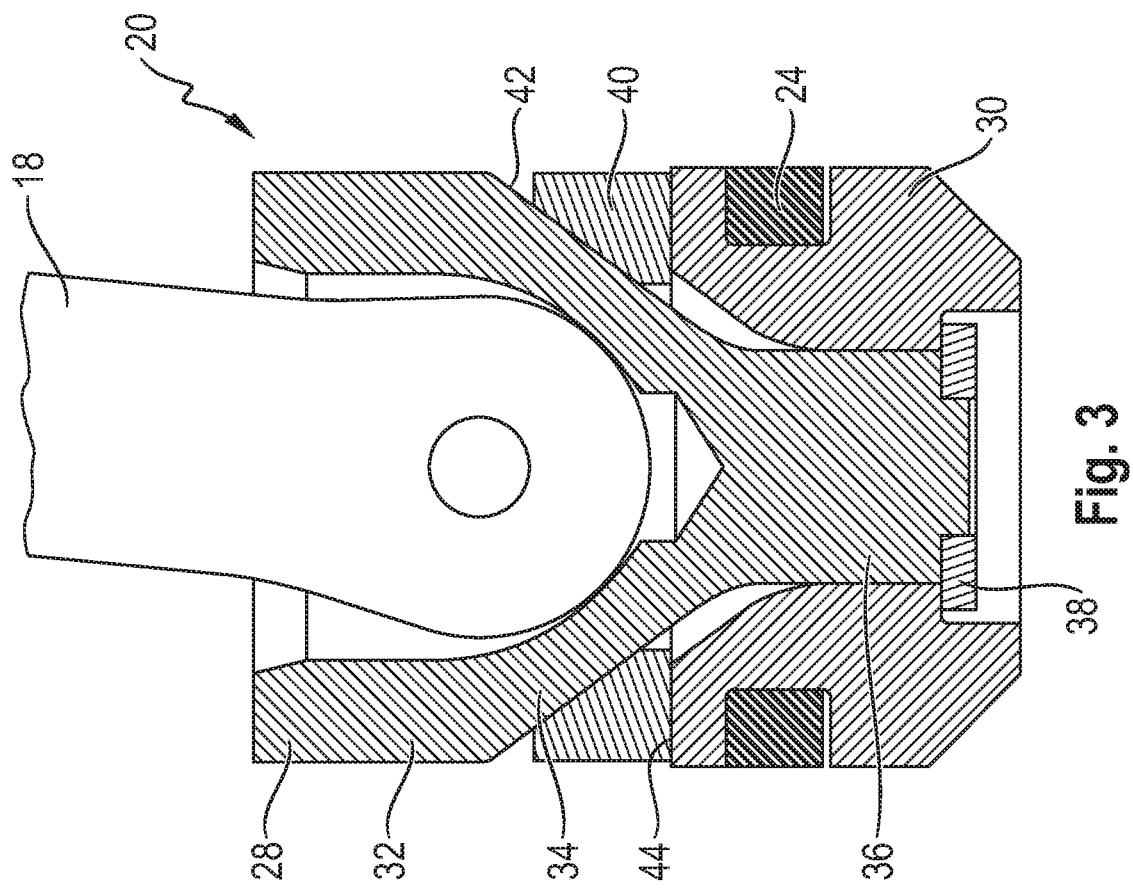

ECCENTRIC MEMBER SUPPORT THAT INCLUDES A PISTON WITH AN EXPANDING RING TO INCREASE FRICTION AGAINST A CYLINDER WALL

CROSS REFERENCE TO RELATED APPLICATION

This application claims priority under 35 USC 119 to German Patent Appl. No. 10 2018 114 349.4 filed on Jun. 15, 2018, the entire disclosure of which is incorporated herein by reference.

BACKGROUND

Field of the Invention

The invention relates to a supporting arrangement for an eccentric member of an adjusting arrangement of a connecting rod of a reciprocating piston internal combustion engine having at least one piston rod that is guided displaceably by a piston and a seal that is connected to the piston in a supporting cylinder that is provided in the connecting rod and has a longitudinal axis. The piston encloses at least one cylinder chamber with the supporting cylinder. The invention also relates to an adjusting arrangement having a supporting arrangement of this type.

Related Art

Adjusting arrangements for a connecting rod are well known in the prior art under the name VCR connecting rod. A variable compression can be realized in the internal combustion engine in a particularly simple way by an adjusting arrangement of this type. The eccentric member enables the connecting rod length and therefore the stroke of the piston in the cylinder of the internal combustion engine to be changed in a particularly simple way. A supporting arrangement and adjusting arrangement of the generic type are disclosed in DE 10 2005 055 199 A1. However, the known supporting arrangement has the disadvantage that an oscillating movement of the adjusting unit can occur due to the increasing gas and mass forces at relatively high engine rotational speeds. These forces lead to a slight compression of the oil, which is incompressible in theory. The rising pressure in the filled cylinder chamber can lead to a "blow-by" phenomena on the seal of the piston, and can contribute to a further increase in the oscillation amplitudes.

It is therefore an object of the invention to avoid the abovementioned disadvantage in a simple and inexpensive way.

SUMMARY

In accordance with an embodiment of the invention, the piston is configured in multiple pieces. More particularly, a piston lower part is arranged on a piston upper part and can be moved in the direction of the longitudinal axis of the supporting cylinder. An expanding ring is provided between the piston lower part and the piston upper part. The expanding ring interacts with face parts of the piston lower part and the piston upper part in such a way that spreading of the expanding ring takes place in the case of a reduction of the spacing of the face part of the piston lower part in relation to the face part of the piston upper part. A friction force can be applied by the expanding ring on an inner wall region of the supporting cylinder. If a defined pressure is exceeded, the piston lower part pushes the expanding ring in the direction of the piston upper part. As a result, the expanding ring is spread open and exerts a friction force on the inner wall region of the supporting cylinder. The additional friction force that is produced in this way opens a parallel force path to the supporting force by way of the oil column, and therefore reduces the tendency of the supporting arrangement to oscillate. In certain embodiments of the supporting arrangement, the additional force path is triggered only after a defined internal pressure is reached in the cylinder chamber.

The piston upper part may be cylindrical. However, the side of the piston upper part that is directed toward the piston lower part may have a truncated cone which tapers toward the piston lower part and is adjoined by a cylindrical attachment piece, the piston lower part being configured substantially as a cylinder, on which the seal member is arranged and which encloses the cylindrical attachment piece, the expanding ring interacting with a shell face of the truncated cone of the piston upper part and an end face of the piston lower part. In this way, a very compact construction of the piston is ensured, and the spreading function of the expanding ring is assured in a simple way. A securing member may mount the piston lower part captively on the cylindrical attachment piece of the piston upper part.

The expanding ring may have a funnel-shaped inner face that is directed toward the shell face of the truncated cone, and thereby assures a very accurate homogeneous spreading of the expanding ring.

The invention also relates to an adjusting arrangement having a supporting arrangement of the type described above. The supporting arrangement may have two supporting cylinders with in each case one piston rod and one piston.

The invention will be described in greater detail using the drawing.

BRIEF DESCRIPTION OF THE DRAWINGS

FIG. 1 is a cut-away view of a connecting rod for a reciprocating piston internal combustion engine with an adjusting arrangement according to the invention.

FIG. 2 is a front view of the connecting rod of FIG. 1 in different "stroke positions".

FIG. 3 is a sectional view of the piston of a supporting arrangement.

DETAILED DESCRIPTION

Figure 5:
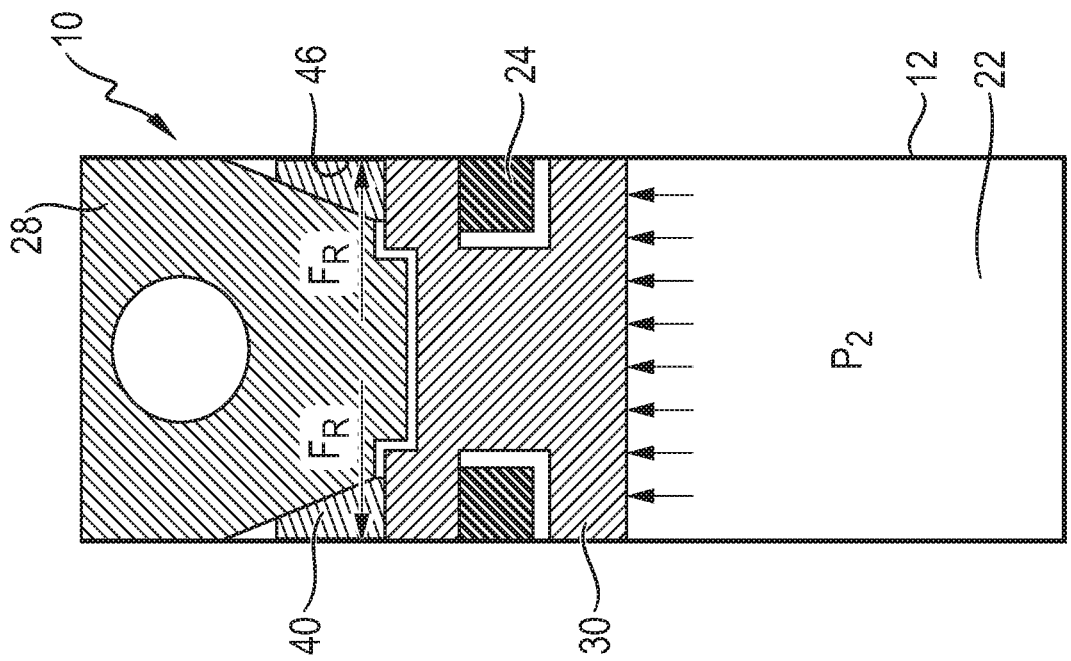
FIG. 5 is a diagrammatic view of the piston of FIG. 3 in the supporting cylinder of the supporting arrangement at a pressure p2.

FIG. 1 shows a VCR connecting rod 2 in a cut-away view. The VCR connecting rod 2 is used in a reciprocating piston internal combustion engine (not shown in further detail). The connecting rod 2 has a connecting rod eye 4 that is connected to a reciprocating piston of the reciprocating piston internal combustion engine. An adjusting arrangement 6 is provided to enable a stroke change to be performed. The adjusting arrangement 6 enables an eccentric member 8 that is arranged in the connecting rod eye 4 to transfer the connecting rod 2 (as shown in FIG. 2) substantially from a "low" position (the left-hand connecting rod in FIG. 2) into a "high" position (the right hand connecting rod in FIG. 2). A supporting arrangement 10 is provided to transfer the eccentric member 8 in a targeted manner and to fix the eccentric member 8 in a desired position. The supporting arrangement 10 has two supporting cylinders 12, 14 each of which has a longitudinal axis 16. In each case one piston rod 18 with one piston 20 is guided displaceably in the supporting cylinders 12, 14. The piston 20 encloses a cylinder chamber 22 with the respective supporting cylinder 12, 14. The cylinder chamber 22 is filled with oil and supports the respective piston 20, and therefore also supports the eccentric member 8 in the selected position. The respective piston 20 has a seal member 24 to seal the cylinder chamber. The respective supporting cylinder 12, 14 has valves 26 to allow the oil to flow into or from the respective cylinder chamber 22 in the case of the transfer movement of the eccentric member 8.

FIG. 3 is a diagrammatic view of the piston 20 of FIG. 1 in a diagrammatic sectional view and is referred to herein to describe the supporting arrangement 10 of the invention in greater detail. The piston 20 is configured in multiple pieces and comprises a piston upper part 28 and a piston lower part 30. The piston rod 18 is articulated in the piston upper part 28. More particularly, the piston upper part 28 is cylindrical in the region 32 that faces away from the piston lower part 30. The cylindrical region 32 is adjoined by a truncated cone 34 that tapers toward the piston lower part 30 and is in turn adjoined by a cylindrical attachment piece 36. The piston lower part 30 is substantially as a cylinder, on which the seal member 24 is arranged, and encloses the cylindrical attachment piece 36. The piston lower part 30 is arranged on the piston upper part 28 to move in the direction of the longitudinal axis 16. A securing member 38 is provided and functions as a captive securing means to prevent the piston lower part 30 from sliding off the piston upper part 28 in the completely unloaded state.

An expanding ring 40 is provided between the piston upper part 28 and the piston lower part 30. The expanding ring 40 interacts with face parts 42, 44 of the piston upper part 28 and the piston lower part 30 in such a way that the expanding ring 40 spreads in response to a reduction of the spacing of the face part 44 of the piston lower part 30 in relation to the face part 42 of the piston upper part 28, and a friction force FR can be applied by the expanding ring 40 on an inner wall region 46 of the supporting cylinder 12, 14 (in this regard, see FIGS. 4 and 5).

On account of the above-described embodiment of the piston upper part 28 and the piston lower part 30, the face part 42 of the piston upper part 28 is configured as a shell face 42 of the truncated cone, and the face part 44 is configured as an end face of the piston lower part 30. The expanding ring 40 has a funnel-shaped inner face 48 on its side that is directed toward the shell face 42 to ensure a particularly homogeneous and defined spreading out.

The method of operation of the supporting arrangement 10 according to the invention will be described once again using FIGS. 4 and 5.

Figure 4:
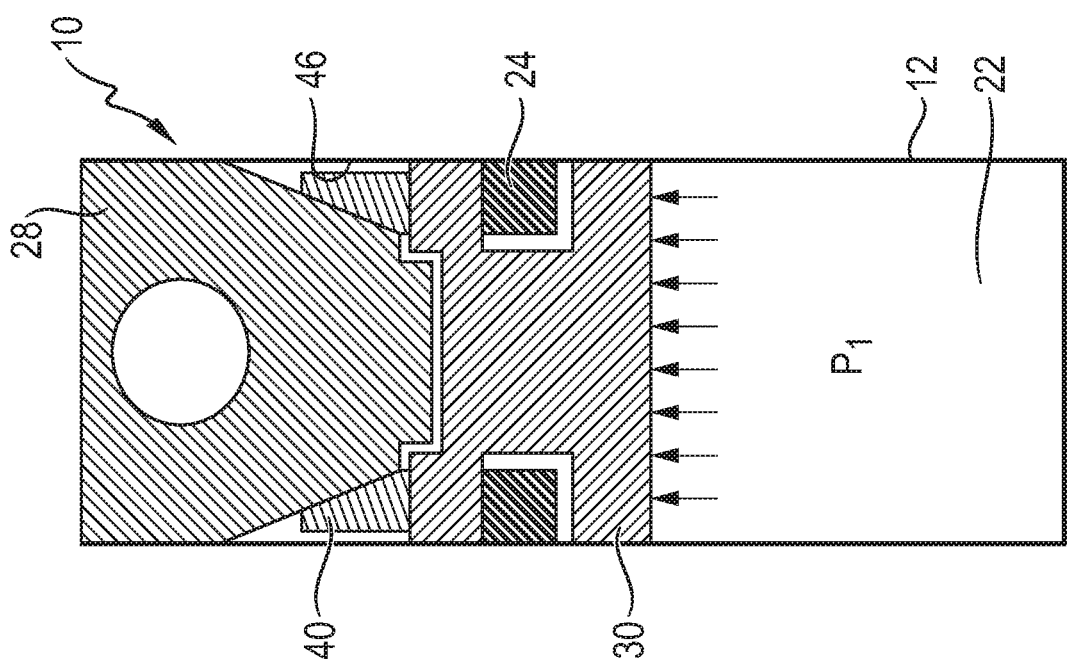
FIG. 4 is a diagrammatic view of the piston of FIG. 3 in a supporting cylinder of the supporting arrangement at a pressure p1.

FIGS. 4 and 5 now diagrammatically show the supporting cylinder 12, a cylinder chamber 22 that is filled with oil being enclosed by way of the multiple-piece piston 20. For the sake of simplicity, the valve 26 from FIG. 1 is not shown here. A pressure p1 prevails in the cylinder chamber 22 and is lower than a preset critical pressure pkrit. As a consequence, no substantial spreading of the expanding ring 40 has yet taken place. Thus, the friction force FR that would have to be exerted on the inner wall region 46 is FR=0, and consequently is not illustrated in FIG. 4. In FIG. 5 the pressure p has risen to the pressure p2, which is now greater than the critical pressure pkrit. Accordingly, an increased force is exerted on the piston lower part 30 which can move with respect to the piston upper part 28. As a result, the spreading ring 40 spreads open and contacts the inner wall region 46 and exerts a force FR on the inner wall region 46. The force FR is dependent on the pressure p2. By way of the additional friction force FR, a parallel force path to the supporting force by way of the oil column is opened, and the tendency to oscillate is reduced considerably.

The invention is not restricted to the illustrated embodiment. The cylinder chamber 22 does not necessarily have to be arranged below the piston lower part 30 and can be arranged above the piston upper part 28. The adjusting arrangement 6 also is not restricted to the embodiment having two supporting cylinders 12, 14. It is also possible that a supporting arrangement 10 with only one supporting cylinder and a plurality of cylinder chambers is provided.

What is claimed is:

1. A supporting arrangement for an eccentric member of an adjusting arrangement of a connecting rod of a reciprocating piston internal combustion engine having at least one piston rod that is guided displaceably by a piston and a seal that is connected to the piston in a supporting cylinder that is provided in the connecting rod and has a longitudinal axis, the piston enclosing at least one cylinder chamber with the supporting cylinder, the piston having opposite upper and lower ends and comprising:

a piston upper part at the upper end of the piston and being articulated to the piston rod, the piston upper part being movable along the longitudinal axis of the supporting cylinder, a truncated cone at a position on the piston upper part spaced from the upper end of the piston and tapering to smaller cross-sections towards a piston lower part at the lower end of the piston, and a cylindrical attachment piece extending down from a lower end of the truncated cone;

the piston lower part mounted over the cylindrical attachment piece of the piston upper part, the piston lower part having an upper face; and an expanding ring between the piston lower part and the piston upper part, the expanding ring having a lower surface engaged against the upper face of the piston lower part and a funnel-shaped inner face on its side engaged with a shell face of the truncated cone of the piston upper part so that spreading of the expanding ring takes place in response to a reduction of a spacing between the upper face of the piston lower part in relation to the shell face of the truncated cone of the piston upper part, and a friction force FR being applied by the expanding ring on an inner wall region of the supporting cylinder due to movement of the expanding ring along the truncated cone of the piston upper part.

2. The supporting arrangement of claim 1, wherein the piston lower part is cylindrical and the seal is arranged on the piston lower part and the piston lower part enclosing the cylindrical attachment piece, the expanding ring interacting with the shell face of the truncated cone of the piston upper part and the upper face of the piston lower part.

3. The supporting arrangement of claim 2, wherein the piston lower part is mounted captively on the cylindrical attachment piece of the piston upper part by a securing member.

4. The supporting arrangement of claim 1, wherein the expanding ring has the funnel-shaped inner face directed toward the shell face of the truncated cone.

5. An adjusting arrangement having the supporting arrangement of claim 1, wherein the supporting arrangement has two supporting cylinders each of which has one piston rod and one piston.

* * * * *